United States Patent [19]

Kawajiri

[11] Patent Number: 5,069,372
[45] Date of Patent: Dec. 3, 1991

[54] CARTON EQUIPPED WITH LIQUID POURING-OUT DEVICE

[75] Inventor: Ryoichi Kawajiri, Kawasaki, Japan

[73] Assignee: Dai Nippon Insatsu Kabushiki Kaisha, Japan

[21] Appl. No.: 512,386

[22] Filed: Apr. 20, 1990

Related U.S. Application Data

[62] Division of Ser. No. 247,371, Sep. 21, 1988, Pat. No. 4,948,015.

[30] Foreign Application Priority Data

Sep. 24, 1987 [JP] Japan .................. 62-145729

[51] Int. Cl.⁵ ............................. B65D 47/10
[52] U.S. Cl. ..................... 222/541; 220/270; 229/123.2
[58] Field of Search ............. 222/81, 94, 541; 220/268, 270; 229/123.2, 123.3, 125.01, 125.04, 125.08

[56] References Cited

U.S. PATENT DOCUMENTS

| | | | |
|---|---|---|---|
| 3,260,411 | 7/1966 | Dobson | 222/107 |
| 3,295,725 | 1/1967 | Brandt | 222/107 |
| 3,459,315 | 8/1969 | Labarre | 222/541 |
| 3,711,011 | 1/1973 | Kugler | 222/541 |
| 3,990,603 | 11/1976 | Brochman | 222/541 |
| 4,165,023 | 8/1979 | Schmit | 222/105 |
| 4,185,757 | 1/1980 | Schultz | 222/107 |
| 4,322,018 | 3/1982 | Rutter | 222/107 |
| 4,360,121 | 3/1981 | Helms | 229/123.2 |
| 4,362,255 | 12/1982 | Bond | 222/107 |
| 4,378,069 | 3/1983 | Franco | 222/107 |
| 4,445,550 | 5/1984 | Davis et al. | 222/107 |
| 4,469,249 | 9/1984 | Malpas et al. | 222/83 |
| 4,483,464 | 11/1984 | Nomura et al. | 222/83 |
| 4,526,297 | 7/1985 | Grimsley | 222/107 |
| 4,705,197 | 11/1987 | Gordon et al. | 222/541 |
| 4,770,325 | 9/1988 | Gordon et al. | 222/541 |
| 4,795,065 | 1/1989 | Ashizawa et al. | 222/541 |
| 4,828,135 | 5/1989 | Kawakami et al. | 220/270 |
| 4,830,273 | 5/1989 | Kalberer et al. | 222/541 |

FOREIGN PATENT DOCUMENTS 60-62027  4/1985  Japan ..................... 222/83

Primary Examiner—H. Grant Skaggs
Assistant Examiner—Steven Reiss
Attorney, Agent, or Firm—Parkhurst, Wendel & Rossi

[57] ABSTRACT

A carton container to be filled with liquids such as beverages, comprises a wall structure of liquid impermeable property, a liquid pouring-out device fixed to a mounting aperture of the wall structure through which device the liquid is poured out, a gas barrier layer provided in said wall structure to prevent gas within the container from passing through the wall structure to the outside, and a gas barrier film provided across the liquid pouring-out device to prevent gas within the container from escaping through the pouring-out device, the gas barrier layer and the gas barrier film being overlapped or continuous when seen in outside-to-inside direction with respect to said wall structure, whereby gas within the container does not escape to the outside even after elapse of a prolonged period of time.

6 Claims, 10 Drawing Sheets

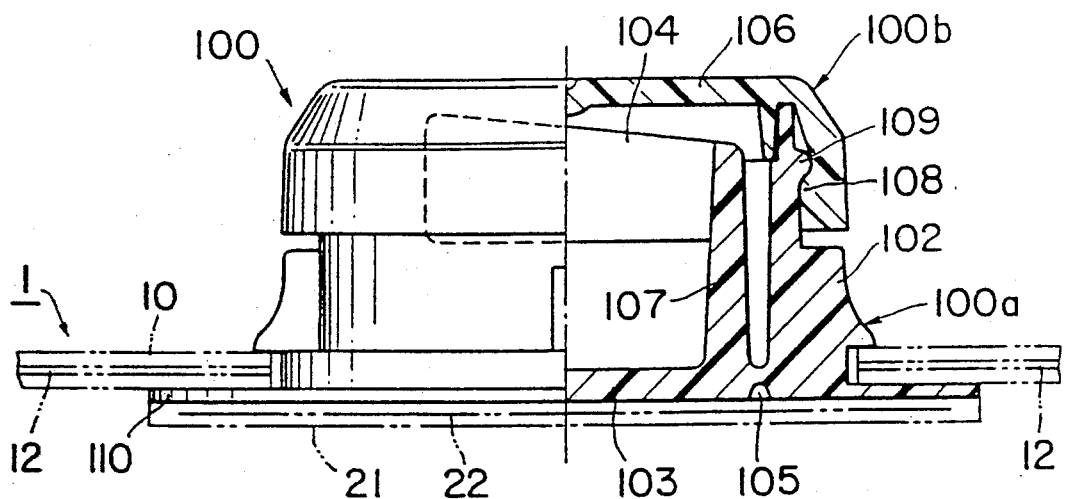
F I G. 6
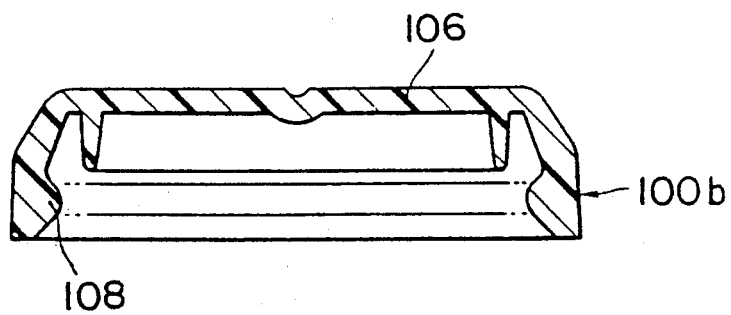
F I G. 7A
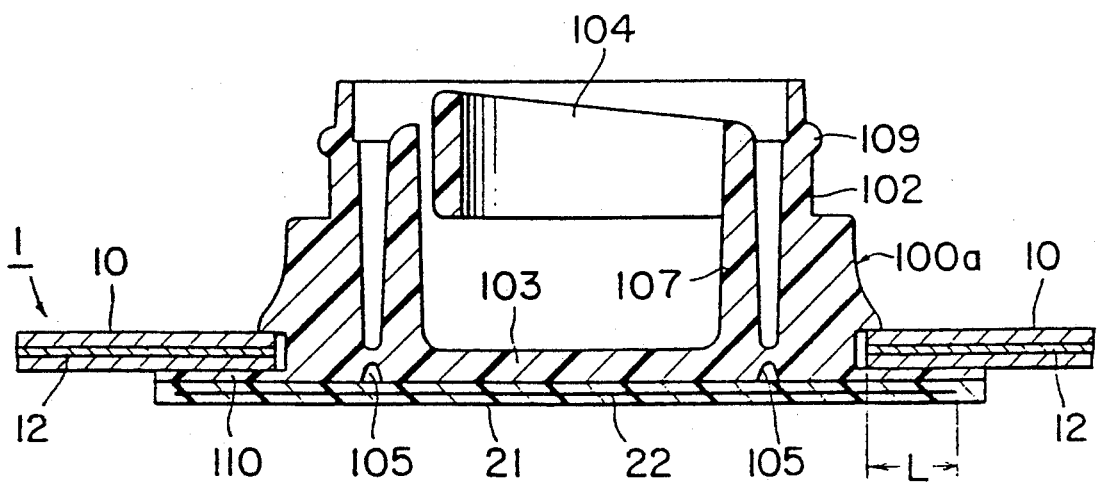
F I G. 7B

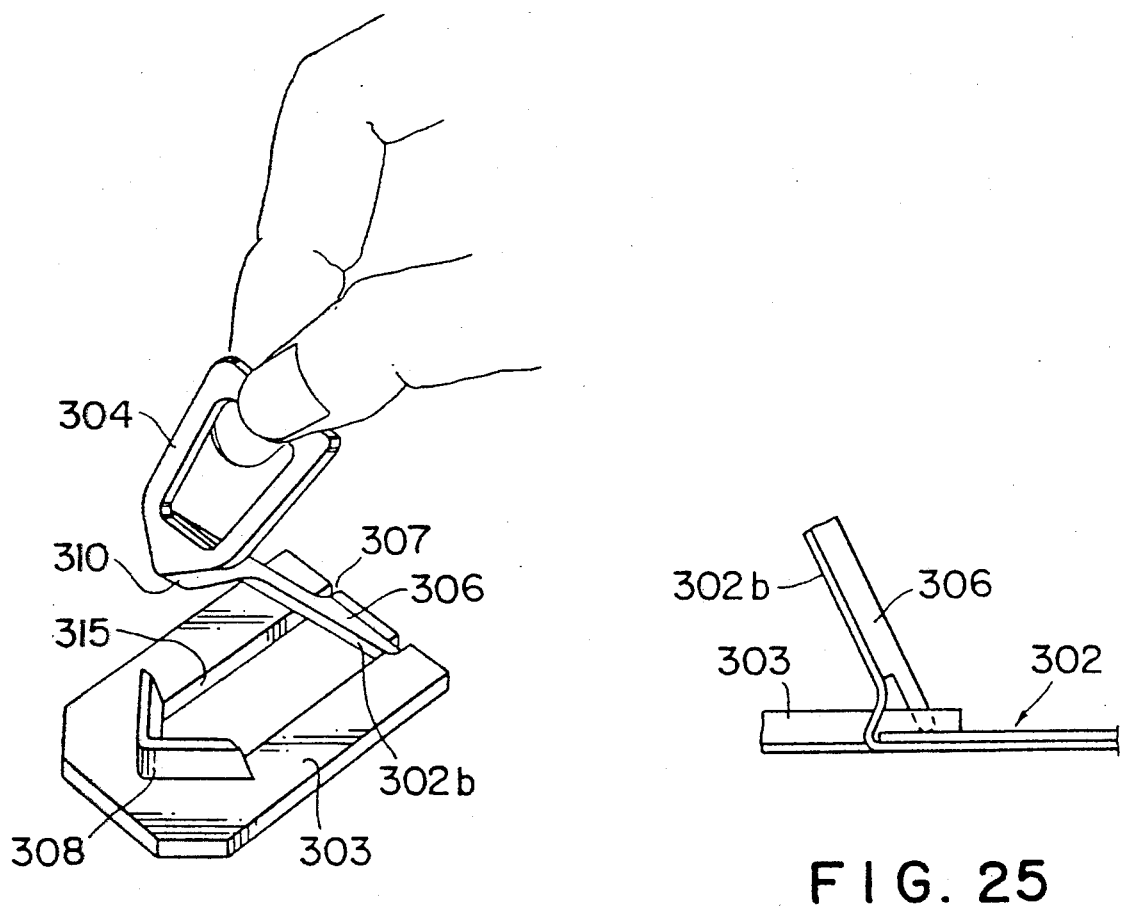
FIG. 24
FIG. 25
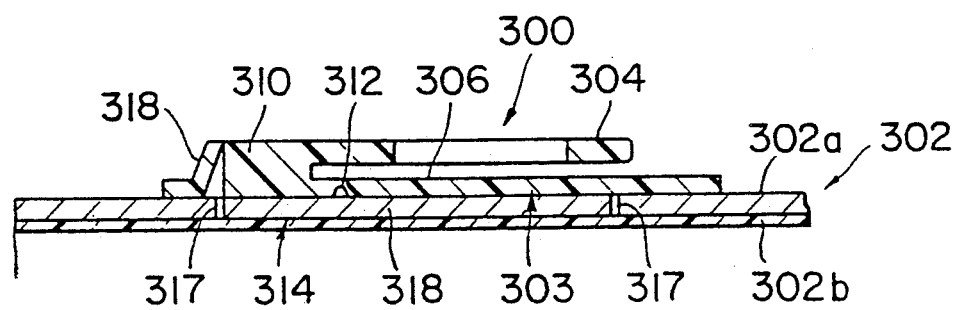
FIG. 26

CARTON EQUIPPED WITH LIQUID POURING-OUT DEVICE

This is a division of application Ser. No. 07/247,371, filed Sept. 21, 1988.

BACKGROUND OF THE INVENTION

This invention relates to packages or carton containers to be filled with liquids such as beverages and, more particularly, to a carton with a liquid pouring-out device, having gas barrier means for preventing gas contained therein to escape therefrom.

A package or container carton, simply called "carton" herein, to be filled with liquids such as beverages, is usually formed into a substantially rectangular parallelepiped shape having a rectangular or square top wall to which a mounting aperture is formed, and an easily openable liquid pouring-out device is fixed to the top wall at the position of the mounting aperture. All of the walls including the top, side, and bottom walls of such a carton are generally provided with a barrier layer made of a thin aluminum film, for example, in a laminated state for imparting a gas barrier property to the carton walls. The liquid pouring-out or dispensing device secured to the top wall of the carton may be also provided with a gas barrier layer for the same purpose. One example of a conventional carton of the character described above is disclosed in Japanese Utility Model Laid-Open Publication (Kokai) No. 163,251/1985.

However, with the liquid containing carton of the conventional type, a thin layer having a property of gas barrier is not provided in the top wall of a the carton around the mounting aperture as will be described later in detail, and accordingly, there exists an area of the top wall having no barrier layer between the edge of the barrier layer applied to the top wall of the carton and the edge of the barrier layer of the liquid pouring-out device applied to the mounting aperture. There is a fear, accordingly, of gas, such as carbon dioxide in a carbonated drink contained in the carton, escaping outwardly, over a prolonged period of time, through the area of the top wall to which the gas barrier layer is not provided, with consequent difficulty in preventing the deterioration of the quality of the liquid such as the beverage filled in the carton.

Furthermore, the liquid pouring-out devices of the conventional types have the problems or defects of being difficult to open or use for pouring the liquid contained in the carton.

SUMMARY OF THE INVENTION

A primary object of this invention is to substantially eliminate the problem encountered in the conventional technique and to provide a package or a container carton to be filled with liquid, equipped with a liquid pouring-out device and having a property of a gas barrier.

Another object of this invention is to provide a carton to be filled with liquid, equipped with an improved liquid pouring-out device which can be easily handled and opened for the hygienic pouring out of the liquid.

These and other objects can be achieved according to this invention by providing a carton to be filled with liquid, comprising a carton container having a wall in which mounting aperture means is provided, the carton container having a gas barrier layer, and a liquid pouring-out device fixed to the wall at a position of the mounting aperture, the pouring-out device having breakable means which is broken when the liquid is poured out, the pouring-out device having a gas barrier layer to prevent leakage of gas through the device, the gas barrier layers of the carton container and the pouring-out device being uninterruptedly continuous when seen from an outside-to-inside direction with respect to the wall.

In one preferred embodiment of the invention, a thin gas barrier film is provided in the wall of the carton container in a laminated condition. The thin barrier film has an edge portion extending substantially to an edge of the wall defining the mounting aperture means. The liquid pouring-out device is provided with a flange which is firmly bonded to the inner surface of the wall around the periphery of the mounting aperture means, and the flange has a laminated structure including a thin gas barrier film layer having its portion overlapped, when seen from the outside to inside with respect to the wall, with the thin barrier film of the wall around the aperture means when the liquid pouring-out device is fitted to the wall.

In another preferred embodiment of the invention, the gas barrier layer of the carton container extends continuously to the area of the mounting aperture means, thereby to constitute the gas barrier layer of the liquid pouring out device, as well. In this embodiment, the two gas barrier layers are integrally continuous and the liquid pouring-out device is bonded to the outer surface of the wall of the carton container.

Preferred embodiments according to this invention will be described further in detail hereunder with reference to the accompanying drawings.

BRIEF DESCRIPTION OF THE DRAWINGS

In the accompanying drawings:

FIG. 6 is a view, partially in elevational section, of a liquid pouring-out device according to a second embodiment of this invention;

FIGS. 7A and 7B are elevational sections of a cap and a main body of the liquid pouring-out device fitted to a carton, respectively;

FIG. 24 is a perspective view of the liquid pouring-out device in a second stage of opening the device;

FIG. 25 is a view explanatory of the liquid pouring-out device in an opened state thereof;

FIG. 26 is a sectional view of another example of the liquid pouring-out device similar to that shown in FIG. 17;

DESCRIPTION OF THE PREFERRED EMBODIMENTS

Figures 27, 28:
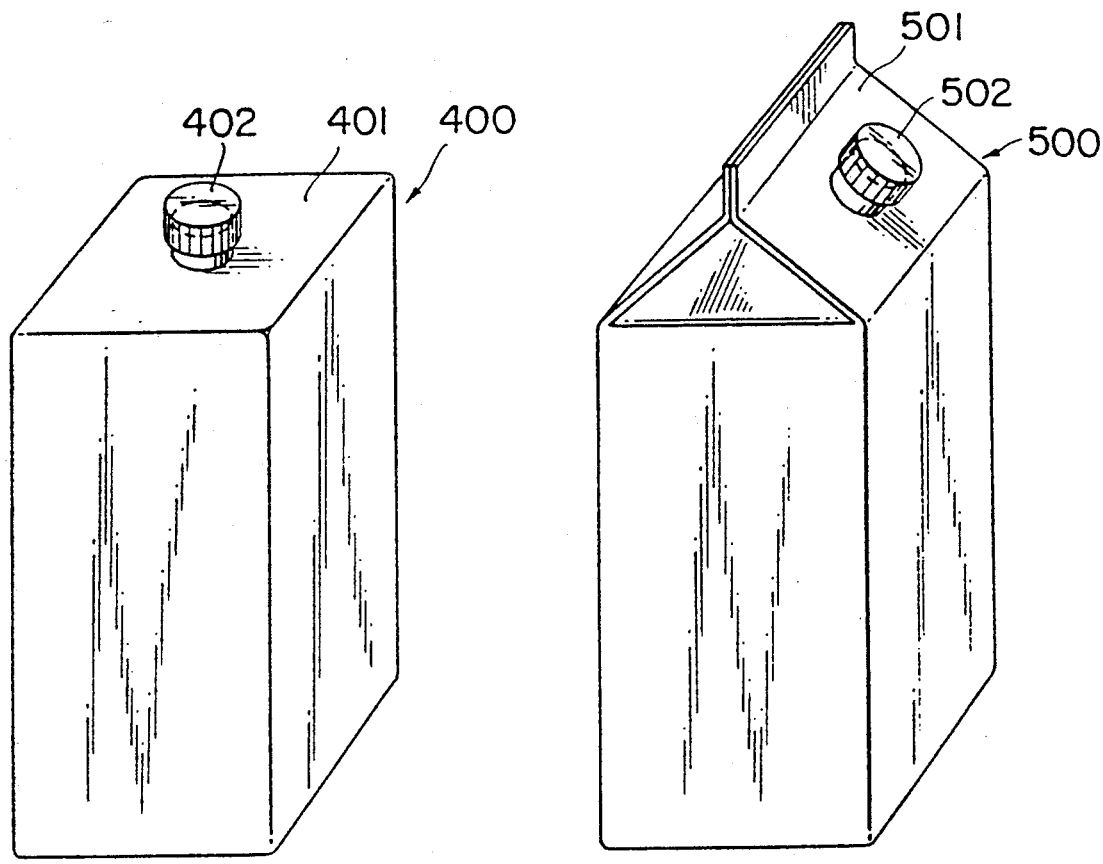
FIGS. 27 and 28 are perspective illustrations of cartons of conventional types to which this invention is applicable and FIG. 29 is a front view, partially in section, of a conventional liquid pouring-out device applied to a carton.
Figure 29:
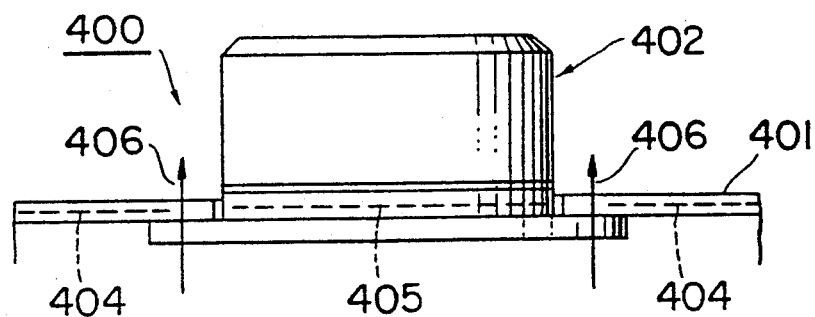

Before the description of preferred embodiments of this invention, background art will be briefly described for better understanding of this invention with reference to FIGS. 27 to 29.

FIG. 27 shows a perspective view of a rectangular package or container carton 400 to be filled with a liquid such as a beverage having a flat top wall 401 to which a liquid pouring-out or dispensing device 402 is attached. FIG. 28 shows also a perspective view of another package or container carton 500 having a gable top wall 501 to which a liquid pouring-out or dispensing device 502 is attached. The liquid pouring-out devices 402 and 502 may be of various types such as a screw cap type, pressure-applying cap type and so on.

FIG. 29 shows a portion of the top wall of the carton, of a type as designated by reference numeral 400 in FIG. 27, including the liquid pouring-out device 402. The wall portion, for example, top wall 401 in the illustration, is fabricated by a laminated sheet material into which a thin film 404 made of aluminum, for example, is interposed for imparting a property, such as a barrier, for example, against a gas sealed in the carton 400, the thin film of this character being called a barrier layer hereinafter. A barrier layer 405 of the same character is also provided at a base portion of the liquid pouring-out device 402.

As shown in FIG. 29, edge portions of these barrier layers 404 and 405 are conventionally spaced apart or separated from each other and, accordingly, the wall 401 of the carton 400 has an area in which the barrier layer is not provided, the area surrounding the base portion of the liquid pouring-out device 402 as viewed in top plan view thereof. With such a construction, a gas sealed in the carton 400 may undesirably pass straight outward as indicated by arrows 406 through that area having no barrier layer, so that it is difficult to maintain the carton 400 completely gas tight and to prevent degradation of the quality of the liquid contained.

This invention is made primarily to eliminate the defects or drawbacks encountered in the conventional liquid carton described above, by the use of an improved liquid pouring-out device. A preferred embodiment according to this invention will first be described with reference to FIGS. 1 to 4.

Figure 2:
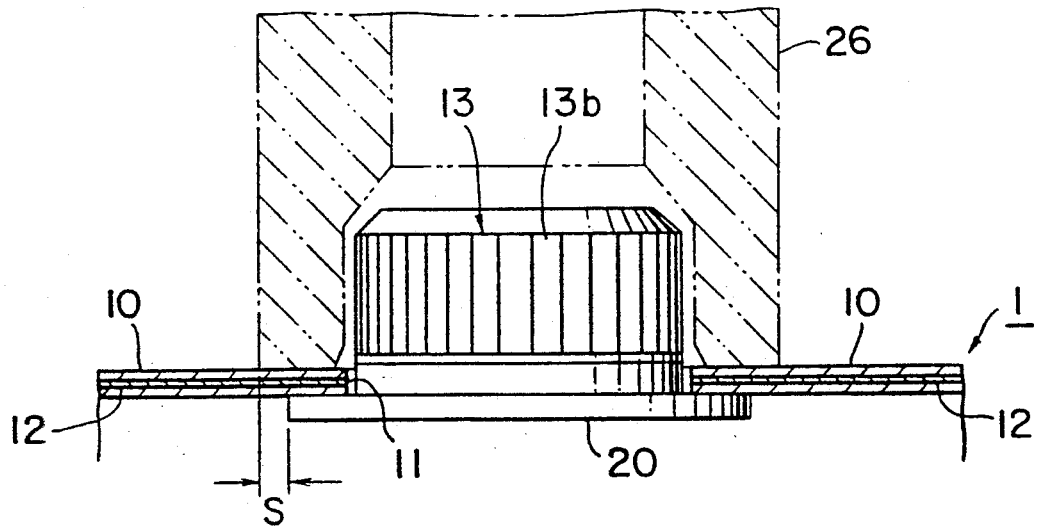
FIG. 2 is a view similar to that shown in FIG. 1, in which the liquid pouring-out device is closed with a cap.

Referring to FIG. 2, a top wall 10 of a carton container or carton 1, which is per se of the type shown in FIG. 26 or 27, is provided with a mounting aperture 11. The wall of the carton 1 is entirely a laminated structure having a liquid-impermeable property and consisting of layers of polyethylene, paper, polyethylene, aluminum, polyethylene-terephthalate, and polyethylene in this order from the outer surface towards the inner surface of the wall, and in FIG. 2, only the aluminum layer 12 constituting a barrier layer is shown for the sake of convenience.

Figure 1:
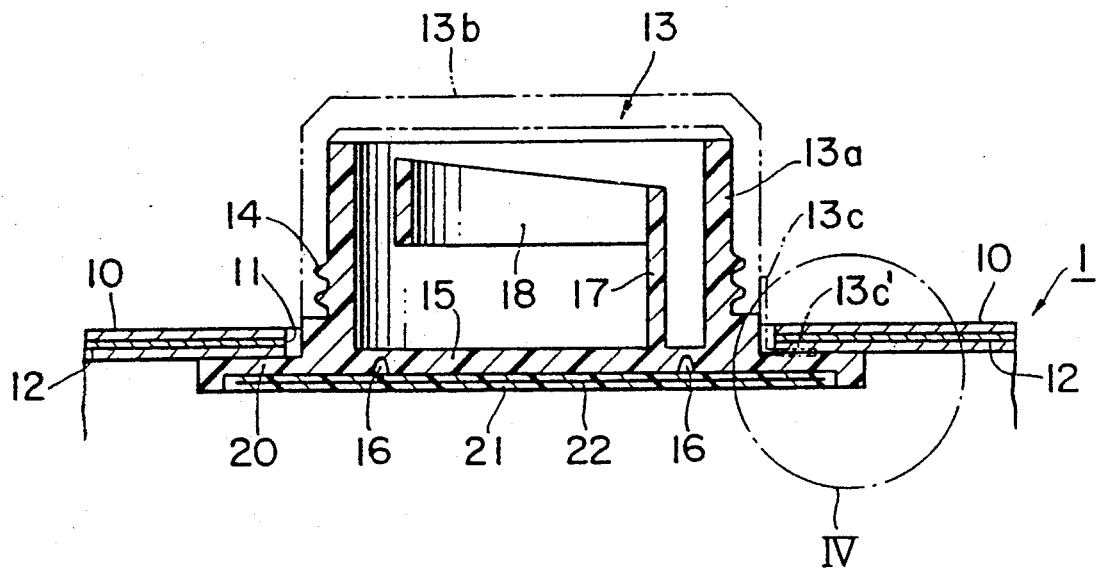
FIG. 1 is an elevational section of a carton equipped with a liquid pouring-out device according to a first embodiment of this invention.
Figure 3:
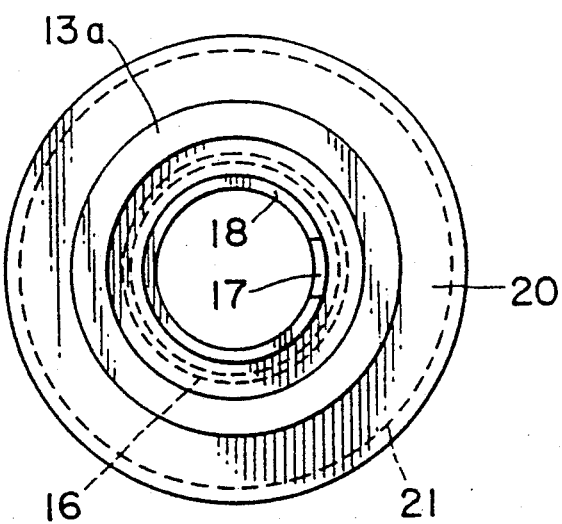
FIG. 3 is a plan view of the liquid pouring-out device.

A cylindrical liquid pouring-out device 13 is fitted into the aperture 11, and as shown in FIG. 1, the liquid pouring-out device 13 comprise a cylindrical main body 13a as a spout and a cap 13b to be applied to the spout 13a a in screw engagement with circumferential screw threads 14 formed on the outer surface of the spout 13a. A partition wall 15 is formed integrally with the bottom portion of the spout 13a and a score line or cut 16 is formed in the back surface of the partition wall 15 so as to have an annular shape, for example, as shown in FIG. 3 for facilitating opening of the device 13. An upright bar 17 is formed integrally with the wall 15 so as to project away therefrom at a position within the area defined by the score line 16, and a pull ring 18 is integrally attached to the top end of the bar 17. A mounting flange 20 is also formed integrally with the bottom of the main body 13. The flange 20 may be formed in an annular shape in plan view, in conformity with the shape of the bottom portion of the liquid pouring-out device. The portions or elements of the pouring-out device 13 may be integrally made entirely of a synthetic resin such as polyethylene resin.

In the illustrated embodiment, as shown in FIG. 1, a recess is formed in the back surface of the mounting flange 20 into which a thin film 21, having a property of a gas barrier, is securely fitted. The film 21 includes a barrier layer 22 as an innermost layer as shown in detail in FIG. 4. The film 21 may be of a laminated structure comprising polyethylene, aluminum and polyethylene layers, the aluminum layer 22 constituting the barrier layer. The thin barrier film 21 may be joined to the partition wall 15 by, for example, insert molding. The barrier layer 22 has its peripheral edge concealed by the material of the film 21 to prevent corrosion of the barrier layer by acids.

Figure 4:
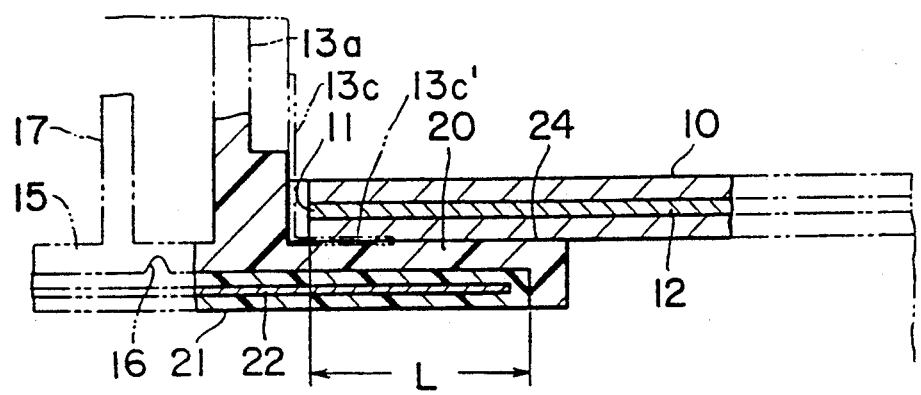
FIG. 4 is a fragmentary elevational section, on an enlarged scale, of a part designated at IV in FIG. 1.

The base portion of the cylindrical spout 13a of the liquid pouring-out device 13 is fitted into the aperture 11 formed in the top wall 10 of the carton 1, and the upper (as viewed) surface of the flange 20 of the spout 13a is bonded to the inner or back surface of the top wall 10 along a bonding surface portion 24 as shown in FIG. 4 by means of an ultrasonic horn 26, for example, as shown in FIG. 2. In such bonding operation, the ultrasonic oscillations will be well transmitted even to the outer peripheral edge of the mounting flange 20 by disposing the horn 26 in a manner such that the radially outer peripheral edge of the horn 26 is positioned radially outwardly from the outer periphery of the flange 20 by a distance S as shown in FIG. 2.

According to the carton 1, provided with the liquid pouring-out device 13 having the structure according to this embodiment, the flange 20 is provided with the thin film 21 functioning as a barrier such that the radially outer edge of the thin film 21 is positioned radially outwardly of the inner edge of the barrier layer 12 of the top wall 10 of the carton 1 as best illustrated in FIG. 4. In other words, the barrier layers 21 and 12 are overlapped by a distance L as shown. Therefore, before opening the liquid pouring-out device 13, gas or the like in the carton 1 is essentially not allowed to pass straight to the outside because the gas must make a detour along the bonding surface portion 24, which however does not readily allow passage of the gas.

When it is required to pour out or dispense the liquid content such as a beverage from the carton, the cap 13b is first removed to expose the interior of the main body 13a and the pull ring 18 is pulled away from the body by a finger, until the partition wall 15 is broken along the score line 16 together with the barrier film 21, whereby the liquid content in the carton can be poured out. The cap 13b will then be reapplied after the pouring-out of the liquid.

In a modification, the cap 13b may be integrally formed with thin depending strips 13c projecting beyond the lower peripheral edge of the cap and equally spaced apart circumferentially of the cap, as indicated by phantom lines in FIGS. 1 and 4. The strips can be molded integrally with the main body of the cap. When the cap 13b is applied to the main body 13a, the depending or projecting portions of the strips 13c are bent and rest on the surface of the flange 20 as shown at 13c'. Thereafter, the upper surface of the flange 20 is bonded to the inner surface of the top wall 10 whereby the portions 13c' are also bonded to the top wall 10. This construction is advantageous because when the cap 13b is turned to open the pouring-out device the strips 13c will be broken, whereby it can be confirmed that the pouring-out device was once opened.

The aforementioned liquid pouring-out device 13 of the carton 1 of the first embodiment is provided with the cap 13b of screw type. However, a pressure-applying type cap may be used for the carton of the type shown in FIGS. 1 to 4 instead of the screw type cap for substantially eliminating inconvenience of the cap screwing operation.

Figure 5:
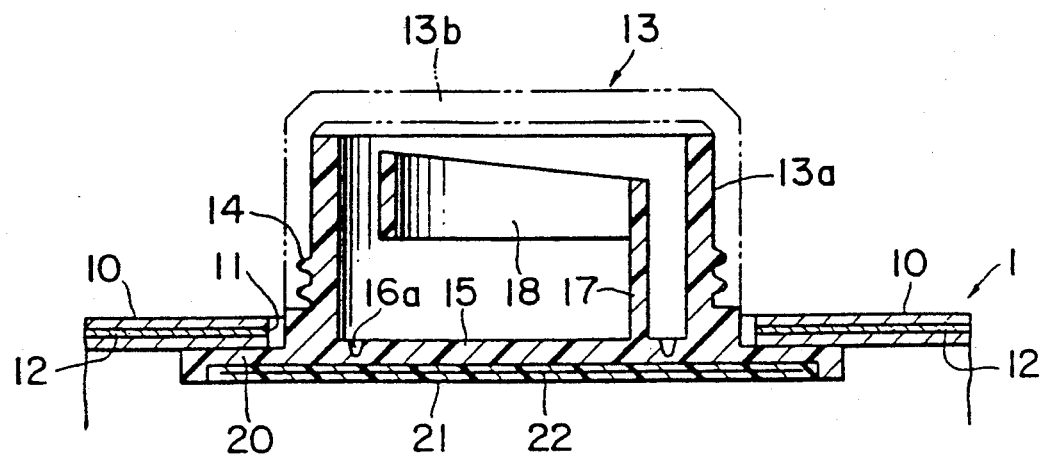
FIG. 5 is a view, similar to FIG. 1, but showing a modified form.

FIG. 5 shows a modification of the pouring-out device shown in FIG. 1. In the modification of FIG. 5, the score line or cut 16a is formed in the surface of the partition wall 15, opposite to the barrier film 21.

Figure 8:
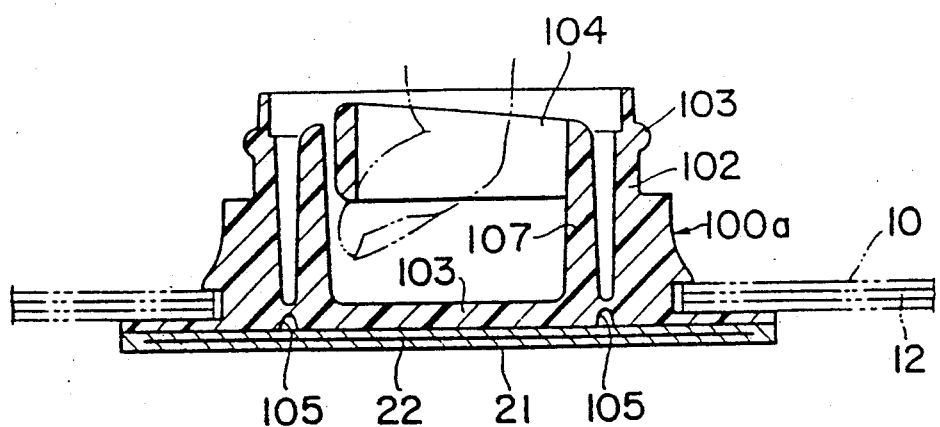
FIG. 8 is also an elevational section similar to that shown in FIG. 7B, but explanatory of the pulling up of a pull ring.

A carton provided with a liquid pouring-out or dispensing device having such pressure-applying type cap will be described below with reference to FIGS. 6 to 8.

A liquid pouring-out device 100 of this embodiment comprises a cylindrical main body 100a as a spout and a cap 100b which have structures similar to those of the aforementioned embodiment except that the cap 100b is of the pressure-applying type. The spout 100a and the cap 100b are made of synthetic resins and molded by an injection molding method, and desirably, the cap 100b is made of a synthetic resin slightly harder than that of the spout 100a.

The spout 100a of the liquid pouring-out device comprises, as best illustrated in FIG. 7B, a spout 102, a bottom wall 103 as a partition wall to be broken when the liquid is to be poured out, an upright member 107 secured to the bottom wall 103 and a pull tab 104 secured to the top of the member 107, these elements or portions being formed integrally. The bottom wall 103 is provided with a score line or cut 105 along which the bottom 103 can be broken when the pull tab 104 is pulled. In this embodiment, the cut 105 is formed on the back surface of the bottom wall 103. An annular bead 109 is formed around the outer periphery of the spout 102.

The cap 100b comprises, as shown in FIG. 7A, a cap body 106 and an annular bead 108 formed on its inner periphery at a lower portion thereof. The bead 108 is engaged with the bead 109 of the spout 102 when the cap 106 is forcibly applied to the spout 100a as shown in FIG. 6.

The container or carton 1 to which the liquid pouring-out device 100 having the construction described above is applied has a laminated wall structure, having a liquid-impermeable property substantially the same as that of the carton 1 shown in FIGS. 1 to 4. That is, concerning a wall 10 of the carton 1, a barrier layer 12 made of an aluminum film, for example, is interposed so as to maintain the property as a barrier against gas contained in the carton 1.

The spout 100a of the liquid pouring-out device 100 is also provided with a flange 110 which is bonded to be fluid-tight to the back surface of the wall 10 of the carton 1 when the pouring-out device is applied to the carton 1. The flange 110 has a structure substantially the same as that of the first embodiment. That is, a laminated film 21 is applied to the back surfaces of the bottom wall 103 and the flange 110, the film 21 including a thin barrier layer 22 of the character described with reference to FIG. 4. Also in this embodiment, the barrier layers 12 and 22 have edge portions overlapped by a distance L around the liquid pouring device 100. Accordingly, the function of preventing passage of gas can be ensured also in this embodiment.

When it is required to pour out or dispense the liquid content in the carton 1, the cap 100b is first pulled and removed from the spout 100a of the liquid pouring-out device. The pull tab 104 is then pulled as shown in FIG. 8 and the bottom 103 is broken. At this time, the barrier film 21 is also broken, and by further pulling the pull tab 104, the pull tab 104, the member 107 and a part of the bottom wall 103 are all removed together, whereby an opening is provided.

Figure 9:
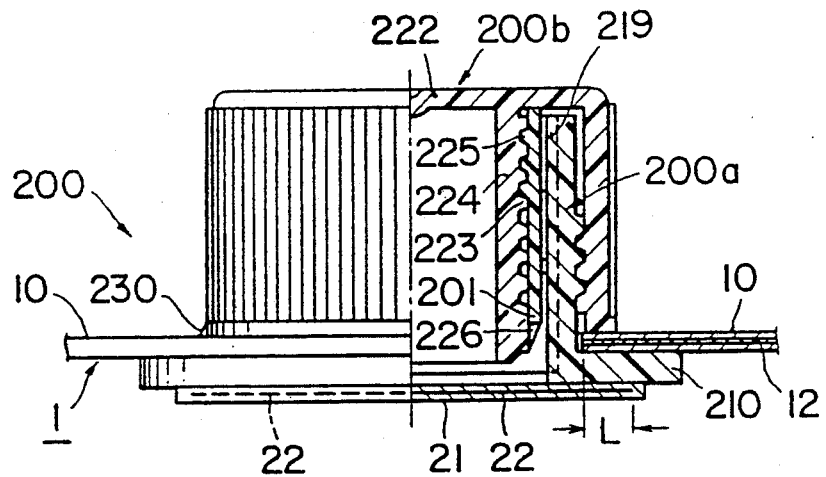
FIG. 9 is a front view, partially an elevational section, of a liquid pouring-out device fitted to a carton according to a third embodiment of this invention.

FIGS. 9 to 13 represent a third embodiment according to this invention. As shown in FIG. 9, a liquid pouring-out or dispensing device 200, shown as applied to a carton 1, generally comprises a cylindrical main body 200a, a cap 200b and a cylindrical piercing member 201. The main body 200a has an annular flange 210 which is bonded to the rear surface of the wall 10 of the carton. The body 200a, the cap 200b and the piercing member 201 are made of synthetic resin and formed by injection molding. A thin film 21 having a barrier layer 22 is attached to the back surface of the flange 210. The film 21 may be formed as a laminated structure having polyethylene-aluminum film-polyethylene layers, as in the first embodiment. As shown in FIG. 12A, the main body or spout 200a of the pouring-out device has screw threads 217 on the outer surface thereof. The screw threads 217 are adapted to be engaged with screw threads of the cap 200b, as will be described later.

The carton 1 to be filled with a liquid such as a beverage has a wall structure, of a liquid impermeable property, substantially the same as those described before, and the wall 10 includes an interposed barrier layer 12. When the liquid pouring-out device 200 is applied to the carton 1 and the flange 210 is bonded to the inner surface of the wall 10, the barrier layers 12 and 22 are overlapped by a distance L around the aperture of the carton, as indicated in FIG. 9. Accordingly, the property, as a barrier, of the carton 1 against gas filled therein can be improved and the quality of the liquid contained can be maintained.

Figure 12A:
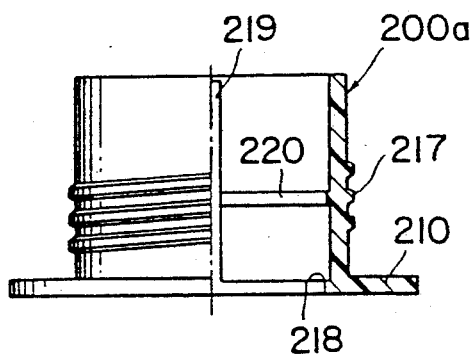
FIGS. 12A and 12B are respectively front and plan views of the main body of the liquid pouring-out device shown in FIG. 11B.
Figure 12B:
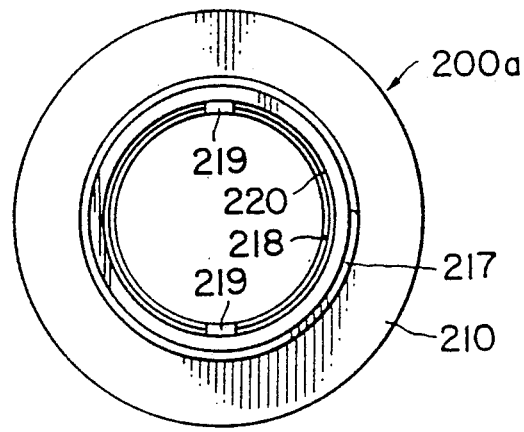

Referring back to the structures of the cap 200b and the main body 200a of the liquid pouring-out device 200, the cylindrical main body 200a is further provided on the inner surface thereof with an annular inner flange 218, as shown in FIG. 12A, to be engaged with the piercing member 201 in a manner to be described later, longitudinal ribs 219 in diametrically opposing arrangement, and an annular rib 220 disposed at an intermediate portion but slightly nearer to the lower end of the inner surface of the main body 200a.

Figure 11A:
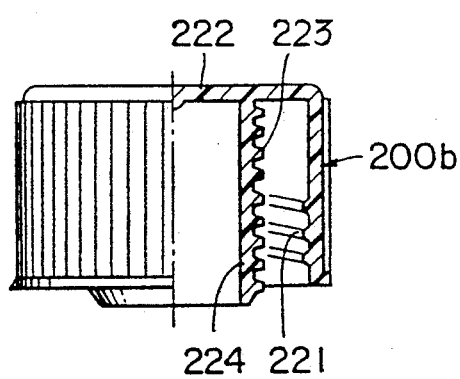
FIGS. 11A and 11B are front views, partially in elevational sections, of the cap and the main body of the liquid pouring-out device, respectively.
Figure 11B:
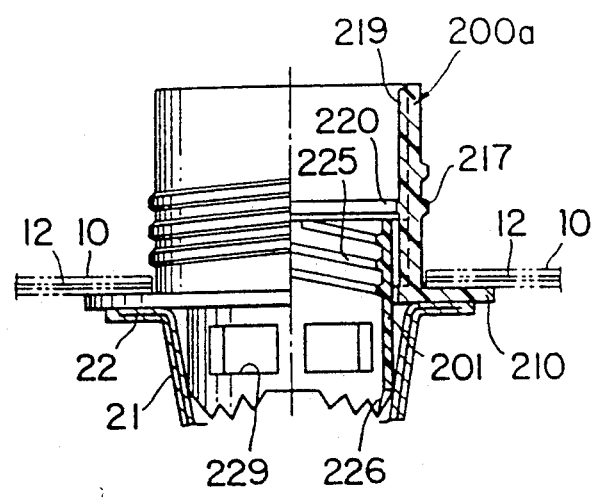

As most clearly shown in FIG. 11A, the cap 200b is provided on the inner surface with screw threads 221 to be engaged with the screw threads 217 of the main body 200a and with a radially inner cylindrical portion 224 extending downwardly from the inner surface of the cap top 222. The cylindrical portion 224 is provided with external screw threads 223, which have the same screw direction as that of the threads 217 but have a pitch larger than that of the threads 217.

Figure 13A:
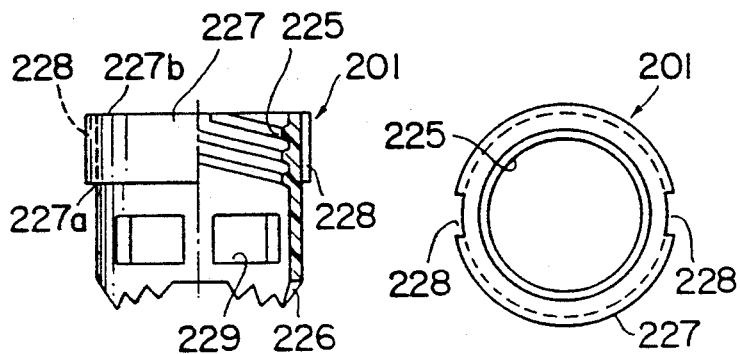
FIGS. 13A, 13B and 13C are front, top plan and bottom plan views, respectively, of a piercing member.
Figure 13B:
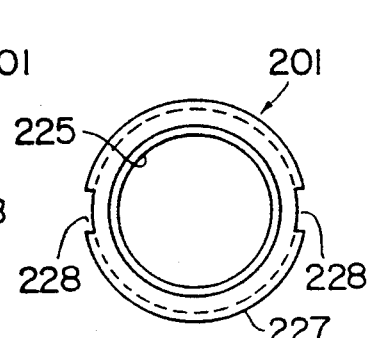
Figure 13C:
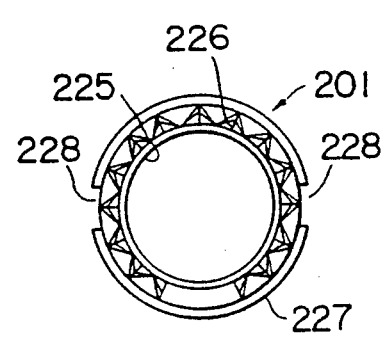

The cylindrical piercing member 201, as shown in FIGS. 13A and 13B, is provided on the inner surface with screw threads 225 to be engaged with the screw threads 223 of the cap 200b when the cap is applied to the main body 200a of the liquid pouring-out device 200 and with a forward, i.e. lower as viewed, end 226 formed as a saw-teeth-like sharp piercing end inclined slightly radially inwardly. The positions of the tips of the sharp piercing end 226 is shown in FIG. 13c. The cylindrical piercing member 201 is also provided around the outer surface of the upper end with a wide ring 227 to which are formed diametrically opposed longitudinal grooves 228 to be engaged with the longitudinal ribs 219 provided on the inner surface of the main body 200a. Through openings 229 are formed below the ring 227. The engagement of the longitudinal ribs 219 and the longitudinal grooves 228 is made at diametrically opposite positions, so that the piercing member 201 can be longitudinally moved smoothly.

The saw-teeth-shaped piercing end 226 has highest teeth at diametrically opposite positions and lowest teeth or portions at positions on a diametrical line, perpendicular to the line connecting the highest teeth.

Figure 10:
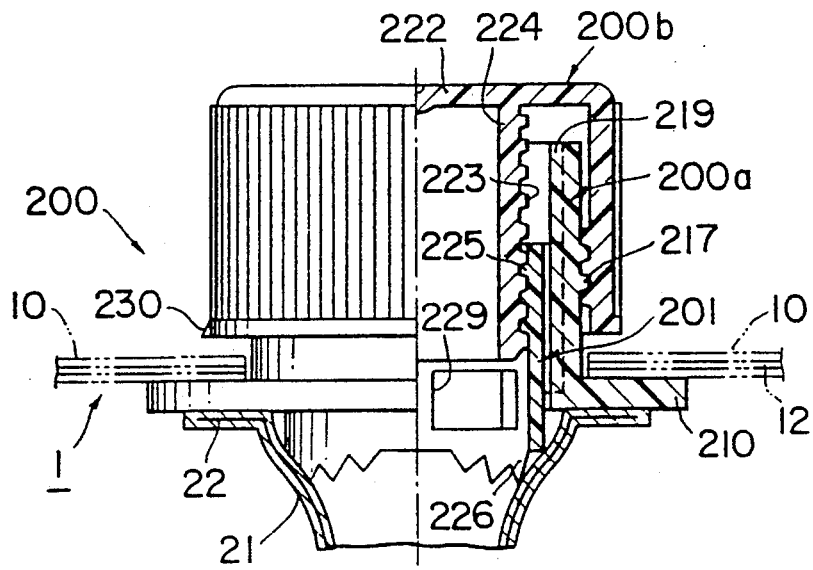
FIG. 10 is a front view similar to that shown in FIG. 9, showing a state where a cap is rotated for removal.

The operative relation of the cap 200b, the piercing member 201 and the main body 200a will be described with reference to FIGS. 9 and 10.

In the state of assembly wherein the cap 200b is applied to the main body 200a in screw engagement, the screw threads 225 and the longitudinal grooves 228 of the piercing member 201 are engaged with the screw threads 223 of the cap 200b and the longitudinal ribs 219 of the main body 200a, respectively. The piercing member 201 is in a positiondisplaced upwardly as viewed in FIG. 9 until the upper end thereof abuts against the inner surface of the cap top 222. In this condition, the forward end 226 of the piercing member 201 is at a position slightly retracted from the innermost, i.e. lower, end of the cylindrical portion 224 of the cap 200b. The barrier film 21 is bonded beforehand to the back surface of the flange 210, as shown.

The thus constructed liquid pouring-out device 200 is secured to the aperture of the carton 1 from the inside thereof in such a manner that the inner peripheral edge of the wall 10 of the carton 1 is temporarily clipped by projections 230 of the cap 200b and the flange 210. The clipped portion of the wall 10 and the flange 210 are thereafter fused by means of an ultrasonic fusing device, for example.

The liquid content filled in the carton 1 is poured out or dispensed by the manner described below.

The cap 200b is first screwed in a direction away from the main body 200a to remove the cap. As a result, the piercing member 201 is displaced toward the interior of the carton as shown in FIG. 10. In this screwing operation, since the pitch of the mutually engaged screw threads 223 and 225 is made larger than that of the mutually engaged screw threads 221 and 217, the amount of displacement of the piercing member 201 towards the carton is larger than the amount of displacement of the cap 200b away from the main body 200a, so that the forward sharp end 226 of the piercing member 201 is projected beyond the back surface of the flange 210 and breaks barrier film 21 before the cap 200b is removed from the main body. In this state, the lower stepped portion 227a (FIG. 13A) of the ring 227, secured to the upper part of the piercing member 201, is engaged with the inner annular flange 218 (FIG. 12A) of the main body 200a, while the upper stepped portion 227b (FIG. 13A) of the ring 227 is engaged with the lower surface of the annular engaging rib 220 of the main body 200a.

As described before, the sharp forward end 226 of the piercing member 201 is slightly inclined radially inwardly and is formed in a wave shape extending from the highest teeth symmetrical with each other to the lower teeth or portions, so that the barrier film 21 is broken in an annular shape with the highest teeth acting first and the lowest teeth acting last for the piercing. After the barrier film 21 is broken and the cap 200b is removed, the carton 1 is inclined, whereby the liquid content is poured out through the broken aperture of the film 21, the central hollow portion of the piercing member 201 and the through openings 229 thereof in the state where the ring 227 of the piercing member 210 is firmly engaged with the annular rib 220 and the flange 218 of the main body 220a.

When the cap 220b is again applied by screwing to the main body 220a after the pouring-out of the liquid content, the cylindrical portion 224 of the cap is also screw-engaged with the piercing member 201, and when the cap is rotated to close the same, the piercing member 201 is drawn into the ca and settles at the position shown in FIG. 9.

The liquid pouring-out device 200 of this embodiment can be applied to a carton provided with a gable top wall as well as to a flat top wall of the types shown in FIGS. 27 and 26, respectively. With a carton provided with the liquid pouring-out device, the device may be covered with a synthetic resin cover or fused with a synthetic resin film when the carton filled with a liquid such as a beverage is delivered to the market.

According to the third embodiment of this invention, the piercing member is advanced or retracted automatically in association with the cap removing and applying operation, so that the operator's fingers do not touch at all the main body or spout of the liquid pouring-out device, whereby the device can be maintained in a hygienic state. The flange of the spout is bonded to the inner surface of the wall of the carton, so that the portion adjacent to the mounting aperture of the carton is kept free from the liquid, thus being maintained in a hygienic state. In addition, the flange and the wall of the carton are provided with the barrier layers which have the mutually overlapping portions, whereby the property of the carton for preventing passage of gas therethrough is improved, thus maintaining the quality of the liquid content in the carton.

In the aforementioned embodiments, the liquid pouring-out device includes the main body and the cap member which protrude from the wall of the liquid carton. Such type of liquid pouring-out devices has the advantages as stated hereinbefore but nevertheless are disadvantageous because of the protrusion of the main body. The cap makes it difficult to stack the cartons vertically.

FIGS. 14 to 26 show a fourth embodiment of a liquid pouring-out or dispensing device to be applied to a liquid container or carton, according to this invention, for eliminating the disadvantage of the liquid pouring-out device mentioned above.

Figure 14:
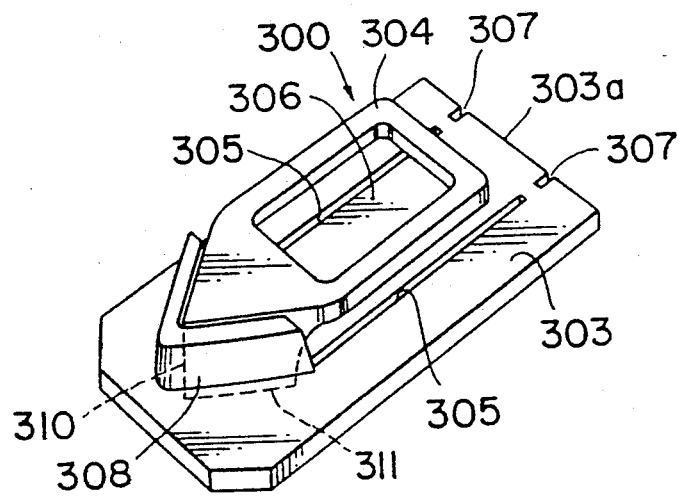
FIGS. 14 and 15 are perspective views of a liquid pouring-out device, as seen in different directions, to be fitted to a carton according to a fourth embodiment of this invention.
Figure 15:
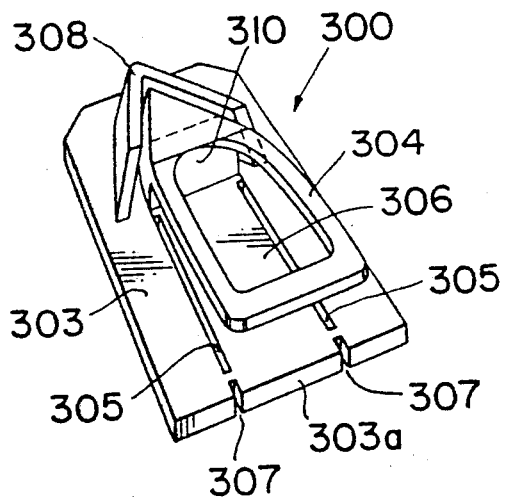
Figure 16:
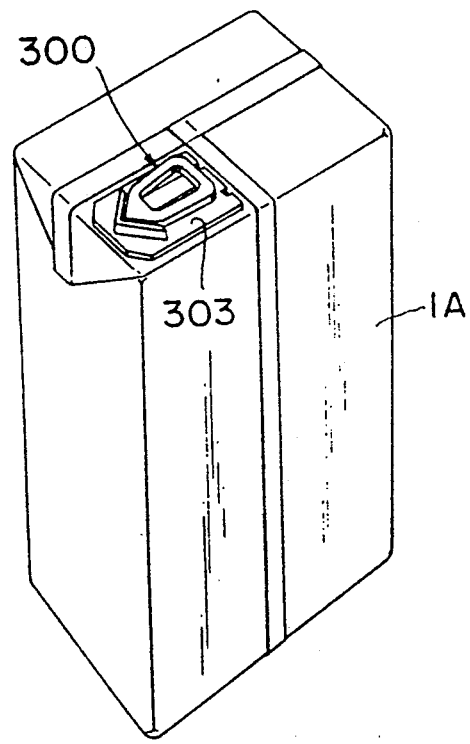
FIG. 16 is a perspective view of the carton to which the liquid pouring-out device shown in FIG. 14 is applied.

FIG. 16 shows a container or carton 1A provided with a liquid pouring-out device 300 according to this embodiment which is shown in detail in FIGS. 14 and 15. The liquid pouring-out device 300 comprises a main body 303 in the form of a planar plate and a pull tab member 304 which are formed of a synthetic resin integrally with the main body 303. The flat main body 303 is provided with a pair of parallel longitudinal score lines or cuts 305 along which a portion 306 of the main body 303 between the score lines 305 can be torn off. The score lines may be formed as cut-in lines or thinned portions provided by forming grooves in the rear surface of the main body 303. The score lines 305 may be eliminated in certain cases. The score lines 305 terminate short of an edge 303a of the body 303, and cutouts 307 are formed in the edge 303a at positions in alignment with the score lines 305.

Figure 17:
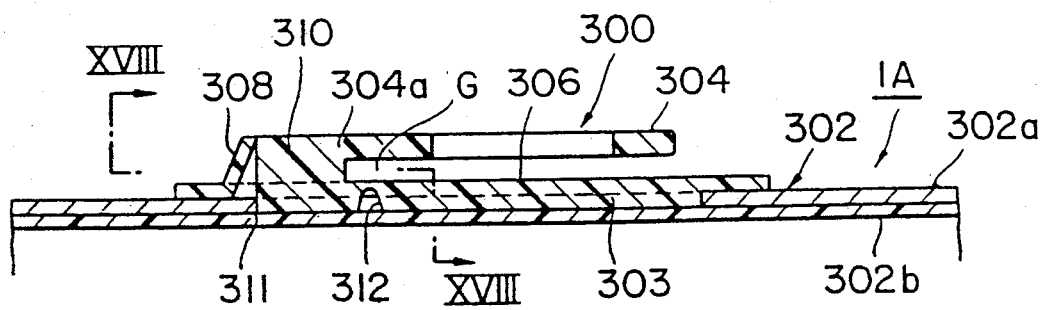
FIG. 17 is an elevational section of the liquid pouring-out device shown in FIG. 14.

An upright wall 308 of angular shape in plan view is formed on the outer surface of the flat main body 303 integrally therewith, adjacent to the edge opposite to the edge 303a having the cutouts 307, and the forward end of the portion 306, remote from the edge 303a, is disposed near the upright wall 308. As shown in FIG. 17, the forward end of the portion 306 is integrally connected to a thick portion 310 having a thickness larger than that of the portion 306. The portion 310 has a front lower breaking edge 311 and is integrally connected at 304a to the pull tab member 304.

The pull tab member 304, in the illustrated embodiment, has a ring shape and positioned over the portion 306 with gap G therebetween. The pull tab member 304 has a transverse dimension larger than the width of the portion 306.

As shown in FIG. 14, the portion 310, and hence the breaking edge portion 311 thereof, has an approximately triangular shape and the upright wall 308 is shaped in plan view to extend along the two sides of the triangular portion 310. The upright wall 308 is inclined so as to approach the portion 310 as it extends upwards, as clearly shown in FIG. 17.

A thinned portion 312 constituting a hinge is formed by a linear groove in the rear surface of the flat main body 303 and the portion 312 extending transversely to the main body 303. It is preferred that the portion 304a of the pull tab member 304, joined to the portion 310, be located at a position towards the portion 310 relative to the hinge 312.

Figure 19:
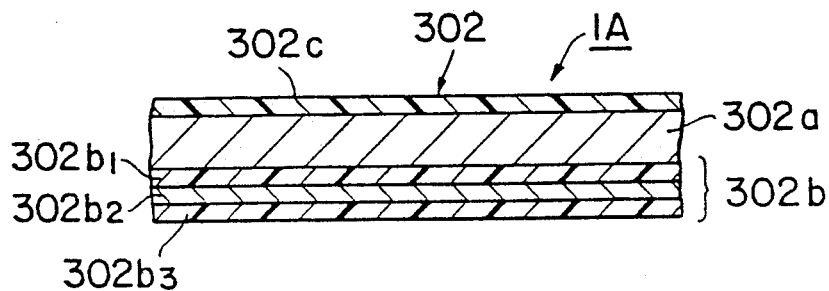
FIG. 19 is a fragmentary sectional view, on an enlarged scale, of a wall structure constituting the carton shown in FIG. 16.

The carton 1A to be filled with liquid such as a beverage is made of a laminated material having a liquid-impermeable property and consisting, as shown in FIG. 19, of a paper-made base material 302a and a liquid-impermeable barrier film 302b bonded to the base material 302a in lamination. More particularly, the liquid-impermeable film 302b includes, for example, a polyethylene layer 302b1, an aluminum layer 302b2 and a polyethylene layer 302b3 in this order from the outer side thereof, and a polyethylene film 302c is further bonded to the outer surface of the base material 302a.

Figure 20:
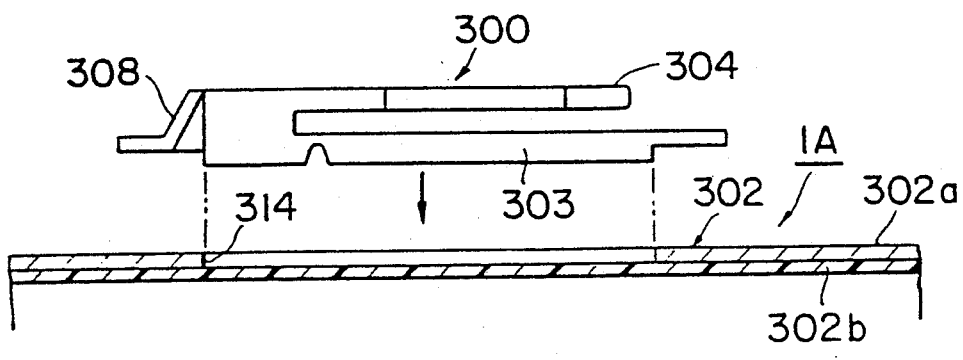
FIG. 20 is a view explanatory of the assembling of the liquid pouring-out device shown in FIG. 14.
Figure 21:
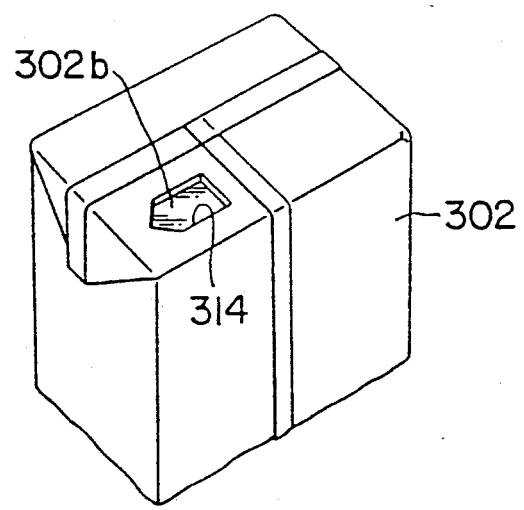
FIG. 21 is a fragmentary perspective view of the carton shown in FIG. 16 before assembling the liquid pouring-out device shown in FIG. 14.

The top wall 302 of the carton 1A is provided, as shown in FIGS. 20 and 21, with a mounting aperture 314 to which the liquid pouring-out device 300 is applied, and the aperture 314 is closed in a sealed manner by the barrier film 302b from the inside of the aperature. The aperture 314 is cut during a conveying process of a blank from which the carton is formed, and the barrier film is then applied to the whole surface of the blank constituting the inner surface of the carton 1A as shown in FIG. 20. Alternatively, a barrier film may be provided to cover a local are covering the mounting aperture 314 of the carton having a wall structure treated so as to be impermeable to the liquid contained therein.

The liquid pouring-out device 300 is bonded to the outer surface of the wall 302 from the state shown in FIG. 20 to the state shown in FIG. 17 by fusing means, for example. More specifically, in the area of the liquid pouring aperture 314, the rear surface of the flat main body 303 and the barrier film 302b are mutually bonded, and in the area outside of the aperture 314, the rear surface of the flat main body 303 and the outer surface of the top wall 302 of the carton 1A are mutually bonded except for the portion between the cutouts 307 for the reason described hereinafter. Alternatively, only the rear surface of the flat main body 303 may be bonded to the barrier film 302b in the aperture 314.

The liquid pouring-out or dispensing operation of the liquid pouring-out device 300, applied to the carton 1A in the manner described above, is carried out in accordance with procedures described below.

Figure 22:
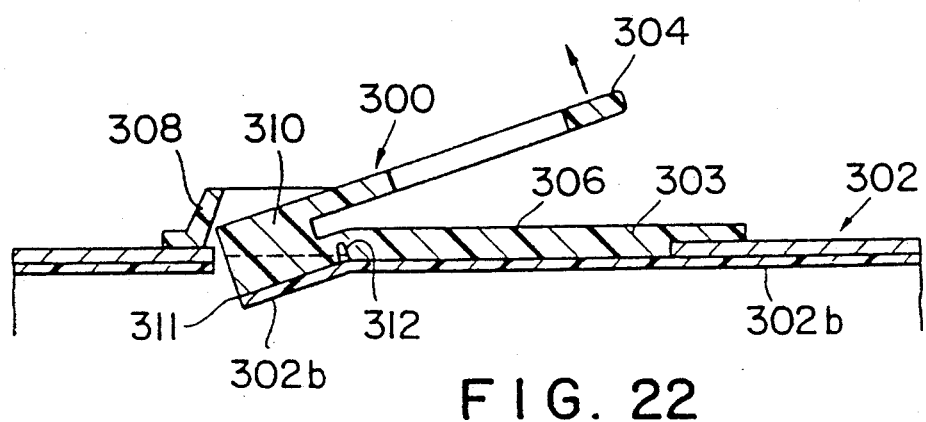
FIG. 22 is a sectional view explanatory of a first stage of opening of the device by means of the liquid pouring-out device shown in FIG. 14.
Figure 23:
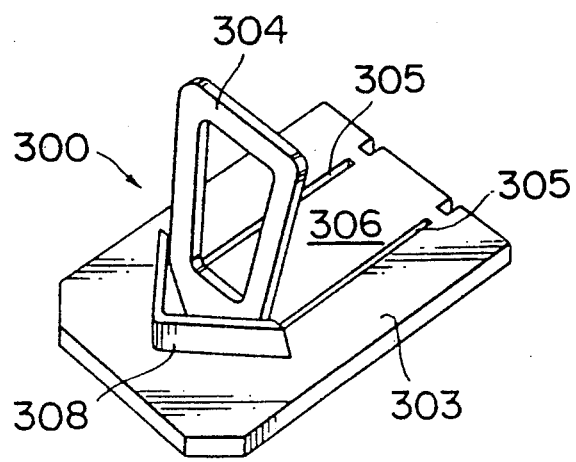
FIG. 23 is a perspective view of the liquid pouring-out device in the state shown in FIG. 22.

The pull tab member 304 in the state shown in FIG. 14, 15 or 16 is first pulled upwardly by finger operation and erected to the state shown in FIG. 23. According to this erecting operation, the portion 310 is inclined downwardly about the hinge 312 as shown in FIG. 22 and the sharp breaking edge 311 of the portion 310 breaks the barrier film 302b. Breaking of the barrier film 302b can be easily done without failure because of the firm bonding between the film 302b and the rear surface of the portion 310.

When the pull tab member 304 is then raised as shown in FIG. 24, the portion 306 between the score lines 305 is separated from the other portions of the flat main body 303 and swung upwardly, and in association with the swinging motion of the portion 306, a portion of the barrier film 302b bonded to the rear surface of the portion 310 is also separated from the rest of the barrier film, whereby a pouring aperture 315 of the body 303 is formed between the score lines 305. The portion of the body 303 between the cutouts 307 is also raised together with the portion 306 during the barrier film tearing operation because the portion between the cutouts 307 is not bonded to the wall surface 302 of the carton 1A. The portion between the cutouts 307 is raised such that the edge thereof comes into frictional contact with the outer surface of the carton 1A and, accordingly, the torn portion 306 is maintained in the raised inclining position without constituting an obstacle for easy pouring of the liquid filled in the carton 1A.

The location of the joining portion 304a of the pull tab member 304 at a position toward the portion 310 relative to the hinge 312 ensures an easy barrier film breaking operation and pulling operation of the portion 306.

The liquid contained in the carton 1A is poured out through the aperture 315 and along the downwardly inclined triangular upright wall 308.

The pull tab member 304 is swung reversely to return the torn portion 306 to the original position after pouring out the liquid in the carton. The portion 310 is again accommodated in a portion backward of the upright wall 308. Since the wall 308 is formed in the inclined manner, the breaking portion 310 can be prevented from rising upwardly, whereby the re-closing state of the liquid pouring-out device is maintained.

Figure 18:
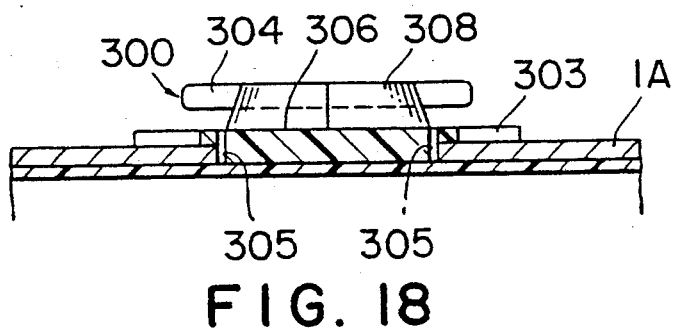
FIG. 18 is a sectional view taken along the line XVIII—XVIII shown in FIG. 17.

The width of the pull tab member 304 is larger, as shown in FIG. 18, than the distance between the score lines 305 and hence the width of the portion 306 to be torn off, so that a portion including the pull tab member 304 never falls into the carton when the liquid pouring-out device is again closed.

The gap G (FIG. 17) between the pull tab member 304 and the main body 303 is used for the engagement of the liquid pouring-out device 300 with a guide rod at a time when the device 300 is transferred towards the carton 1A for the bonding thereto.

The liquid pouring-out device 300 is merely bonded to the outer surface of the sealed carton 1A, so that an aseptic condition in the carton can be maintained.

In the embodiment described above, the portions 306 and 310 of the liquid pouring out device 300 are bonded directly to the upper surface of the barrier film 302b covering the inner side of the aperture 314, but in an alternative form shown in FIG. 26, the aperture is closed by a portion 318 of the wall 302 of the carton 1A and provided with a slit 317 along which the portion 318 of the wall 302 is easily removed when the pull tab member 304 is pulled upwardly. In this form, the portions 306 and 310 are bonded to the portion 318 of the wall 302 to close the aperture 314, the portion 318 being bonded to the barrier film 302b, and accordingly, when the pull tab member 304 is pulled upwardly, the portion 318 and the barrier film portion torn are also lifted together with the portions 306 and 310 of the liquid pouring-out device.

As described before, according to the preferred embodiments of this invention, a carton package or container is provided with a wall structure and a liquid pouring-out device, both functioning as a gas barrier for maintaining the quality of liquid contained in the carton without degradation. In addition, the manner of fitting the improved liquid pouring-out device to the carton wall facilitates easy handling of the same and makes the carton hygienic.

What is claimed is:

1. A carton to be filled with a liquid, comprising:
  a liquid impermeable carton container including a wall structure having a mounting aperture provided therein and a gas barrier film disposed on an inner surface of said wall structure and across said mounting aperture;
  a liquid pouring-out device fixed to said wall structure and disposed across said mounting aperture, said pouring-out device having a gas barrier layer and being bonded to said barrier film across said mounting aperture such that said barrier film of said wall structure and said barrier layer of said pouring-out device are uninterruptedly continuous when viewed in an outside-to-inside direction with respect to said wall structure, said pouring-out device comprising:
  (i) a planar main body having a thin portion forming a traverse hinge in said main body;
  (ii) a thick portion integrally formed with an end of said main body and having a breaking edge which is disposed within said mounting aperture and contacts said barrier film; and
  (iii) a pull tab member integrally formed with said thick portion;
  whereby said breaking edge of said thick portion is pivoted about said hinge into contact with said barrier film when said tab member is pulled, thereby breaking said barrier film such that the liquid is pourable therethrough.

2. A carton to be filled with a liquid, comprising:
  a liquid impermeable carton container including a wall structure provided with a removable portion defined by a slit, and a gas barrier film disposed on an inner surface of said wall structure including said removable portion;
  a liquid pouring-out device fixed to said wall structure and disposed across said removable portion so as to cover said slit, said pouring-out device having a gas barrier layer and being attached to said removable portion so as to be fixed to said wall structure such that said gas barrier film of said wall structure and said barrier layer of said pouring-out device are uninterruptedly continuous when viewed in an outside-to-inside direction with respect to said wall structure, said pouring-out device comprising:
  (i) a planar main body having a thin portion which forms a traverse hinge in said main body;
  (ii) a thick portion integrally formed with an end of said main body and having a breaking edge contacting an edge of said removable portion; and
  (iii) a pull tab member integrally formed with said thick portion;
  whereby a breaking edge of said thick portion is pivoted about said hinge and acts inwardly upon said removable portion when said tab member is pulled, thereby breaking said barrier film such that the liquid is pourable therethrough.

3. The carton of claim 2, further comprising an upright wall disposed on said main body adjacent said thick portion.

4. The carton of claim 2, wherein said pull tab member extends parallel to said main body.

5. The carton of claim 2, wherein said main body has a pair of cut lines extending from said thick portion along a length of said main body to define therebetween a tearable portion, such that an opening is formed through said tearable portion when said tab member is pulled.

6. The carton of claim 5, wherein said tab member has a width which is greater than a distance between said cut lines.

* * * * *